United States Patent [19]

Kusakabe et al.

[11] Patent Number: 4,718,470

[45] Date of Patent: * Jan. 12, 1988

[54] PNEUMATIC RADIAL TIRES

[75] Inventors: Noboru Kusakabe, Ohme; Masaaki Morimoto, Sakato; Eiichi Koyama; Koichi Kojima, both of Higashimurayama, all of Japan

[73] Assignee: Bridgestone Tire Company Limited, Japan

[*] Notice: The portion of the term of this patent subsequent to Aug. 23, 2000 has been disclaimed.

[21] Appl. No.: 838,194

[22] Filed: Mar. 7, 1986

Related U.S. Application Data

[63] Continuation of Ser. No. 184,839, Sep. 8, 1980, abandoned.

[30] Foreign Application Priority Data

Sep. 13, 1979 [JP] Japan .................. 54-116733

[51] Int. Cl.$^4$ ................................ B60C 9/18
[52] U.S. Cl. ....................... 152/451; 57/902; 152/527
[58] Field of Search .............. 152/451, 527, 556; 57/902, 228, 226, 204, 208; 428/295

[56] References Cited

U.S. PATENT DOCUMENTS

| | | | |
|---|---|---|---|
| 2,492,352 | 12/1949 | Bourdon | 57/902 X |
| 3,090,189 | 5/1963 | Boussu et al. | 57/311 |
| 3,273,978 | 9/1966 | Paul | 152/359 |
| 3,682,222 | 8/1972 | Alderfer | 152/361 |
| 4,047,552 | 9/1977 | Maeda et al. | 152/361 R |
| 4,161,203 | 7/1979 | Suzuki et al. | 152/359 |
| 4,258,543 | 3/1981 | Canevari et al. | 152/359 |
| 4,333,306 | 6/1982 | Yamashita et al. | 152/359 |
| 4,399,853 | 8/1983 | Morimoto et al. | 152/527 |

FOREIGN PATENT DOCUMENTS 56-163905  12/1981  Japan .................. 152/527

OTHER PUBLICATIONS

Research Disclosure No. 17015, Jun. 1978, disclosed anonymously.

*Primary Examiner*—Donald E. Czaja
*Assistant Examiner*—Ramon R. Hoch
*Attorney, Agent, or Firm*—Sughrue, Mion, Zinn, Macpeak and Seas

[57] ABSTRACT

A pneumatic radial tire comprising a carcass of a radial structure and a belt superimposed about a crown portion of the carcass is disclosed. The belt is composed of at least one open-twisted steel cord layer formed by embedding open-twisted steel cords. Each cord is composed of 4–5 steel filaments and having an elongation of 0.2–0.7% under a load of 5 kg/cord and a twisting pitch of 8–16 mm, in a coating rubber having a 100% modulus of 30–70 kg/cm$^2$.

9 Claims, 4 Drawing Figures

PNEUMATIC RADIAL TIRES

This is a continuation of application Ser. No. 184,839, filed Sept. 8, 1980, now abandoned.

This invention relates to pneumatic radial tires, and more particularly to novel pneumatic radial tires for passenger cars having improved durability, irregular wear resistance and ride feeling by using steel cords with a novel twisting construction as a belt reinforcement.

In steel radial tires, particularly pneumatic steel radial tires for passenger cars, steel cords with a so-called 1×4 or 1×5 construction, each cord composed of 4–5 steel filaments, have widely been used as the belt reinforcement for such tires.

In steel radial tire of this type, separation phenomenon is recognized to occur in the end portion of the belt. Therefore, in order to improve such a separation phenomenon, rubbers having a high elasticity and an excellent crack propagation resistance are currently used as a belt coating rubber. On the other hand, the travelling speed of vehicles has tended to gradually increase in accordance with the completion of paved roads, the improvement of transportation efficiency accompanied therewith and the like. As a result, the demand for the flattening of tire and the improvement of high-speed durability is apt to gradually increase and it is required to further increase the elasticity of the belt coating rubber.

However, when the elasticity of the belt coating rubber is made higher, the separation phenomenon of the belt end portion is certainly improved, but the belt is inversely subjected to dynamic flexing compression movement during the use of the tire, hence, the steel cords in the belt are liable to produce buckling fatigue. This results in the failure of the steel cord prior to the complete wear of the tread rubber. Particularly, this tendency increases in case of flattening the tire, so that there is a serious problem in durability of the tire.

When conventional steel radial tires are compared with the conventional textile radial tires, the rigidity of the belt is high and the cornering stability is excellent, but the ride feeling is poor and the commercial value deteriorates due to the irregular wear phenomenon produced by the flattening of the tire and the block pattern formation of the tire tread. Furthermore, the steel cord used for the belt of the conventional steel radial tire has a cavity in its central portion, so that when external injury reaches from the outer surface of the tread to the belt, water penetrating into the belt spreads along the longitudinal direction of the steel cord to produce and diffuse rust. As a result, the adhesion of steel cord to rubber lowers in the rust generating portion to cause the separation failure.

Under the above circumstances, the inventors have made various studies in order to provide pneumatic radial tires including a belt of a novel construction, which solves the above mentioned drawbacks of the conventional radial tires. They have found that the above drawbacks can be solved by using a belt composed of at least one open-twisted steel cord layer consisting of steel cords with a particular open-twisted construction embedded in a particular coating rubber, and as a result, the invention has been accomplished.

According to the invention, there is provided a pneumatic radial tire comprising a carcass of a radial structure and a belt superimposed about an outer periphery of a crown portion of said carcass and composed of a rubberized steel cord layer, the improvement wherein said belt is composed of at least one open-twisted steel cord layer formed by embedding open-twisted steel cords, each cord being composed of 4 to 5 steel filaments and having an elongation of 0.2 to 0.7% under a load of 5 kg/cord and a twisting pitch of 8 to 16 mm, in a coating rubber having a 100% modulus of 30 to 70 $kg/cm^2$.

The invention will now be described with reference to the accompanying drawing, wherein:

FIG. 1b is an enlarged sectional view of steel filaments constituting the steel cord of FIG. 1a;

FIG. 2b is an enlarged sectional view of steel filaments constituting the steel cord of FIG. 2a.

Figure 1A:
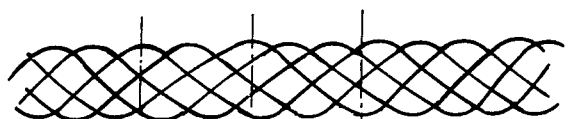
FIG. 1a is a side view of a steel cord used in the conventional tire.
Figure 1B:
Figure 2A:
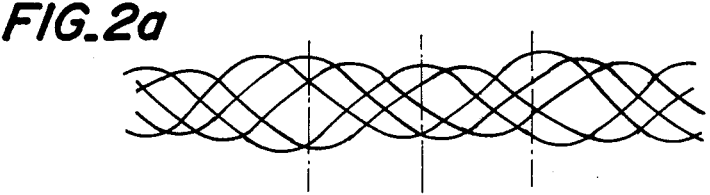
FIG. 2a is a side view of an embodiment of the open-twisted steel cord according to the invention.
Figure 2B:
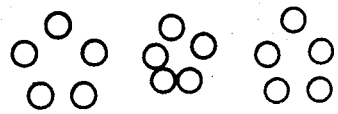

As shown in FIG. 1, the conventional steel cord has a close-twisted construction wherein all steel filaments are twisted with each other in a close relation toward the longitudinal direction of the cord. On the contrary, the term "open-twisted steel cord" used in the invention means to have an open-twisted construction wherein all of steel filaments are twisted without being closed to each other, which construction appears substantially periodically toward the lengthwise direction of the cord. An example of an open-twisted construction is shown in FIG. 2. That is, it is apparent from FIGS. 1a and 1b that all steel filaments are closed to each other in any section of the conventional steel cord. On the other hand, it can be seen from FIGS. 2a and 2b that the open-twisted steel cord according to the invention has a twisting construction wherein all steel filaments are not closed to each other alternately or periodically in the lengthwise direction of the cord. Further, as apparent from FIG. 2b, there is existent a portion wherein some filaments are closed to each other and the remaining filaments are not closed to each other in the steel cord along the longitudinal direction thereof, which is preferably suitable for penetrating the coating rubber into the inside of the steel cord.

As mentioned above, the belt to be used in the tire of the invention is composed of at least one open-twisted steel cord layer formed by embedding the open-twisted steel cords in a coating rubber having a 100% modulus of 30–70 $kg/cm^2$. In this case, each open-twisted steel cord is composed of 4–5 steel filaments and has an elongation of 0.2–0.7% under a load of 5.0 kg/cord and a twisting pitch of 8–16 mm.

The reason why the elongation under a load of 5 kg/cord is limited to 0.2–0.7% is based on the fact that when the elongation is less than 0.2%, there is no great difference to the conventional steel cord and the object of the invention cannot be achieved. But, when the elongation exceeds 0.7%, the twist is apt to be disordered at the cut end portion of the steel cord and hence there are problems in the production of tires.

In the open-twisted steel cord according to the invention, it is necessary to limit the twisting pitch of the cord to 8–16 mm from the following reason. When the twisting pitch is smaller than 8 mm, the productivity of the cord considerably reduces and the commercial value is practically poor, while when the twisting pitch exceeds 16 mm, the resistance to the cord breaking largely reduces due to the buckling fatigue of the cord.

In the coating rubber embedding the open-twisted steel cords, the 100% modulus is necessary to be within a range of 30–70 kg/cm$^2$, preferably 35–55 kg/cm$^2$. When the 100% modulus is less than 30 kg/cm$^2$, the strain produced in the end portion of the cord becomes larger and the resistance to the belt end separation (crack growth of belt coating rubber from cord end of belt) deteriorates. While, when the 100% modulus exceeds 70 kg/cm$^2$, the durability of the belt is apt to deteriorate or cord breaking is apt to occur and at the same time the workability considerably lowers.

The steel filament constituting the open-twisted steel cord according to the invention is desirable to have a diameter of 0.12–0.4 mm. When the diameter is less than 0.12 mm, the strength of the filament is fairly poor while when the diameter exceeds 0.4 mm, the fatigue resistance of the filament reduces to an extent unsuitable for practical uses.

Moreover, in order to improve the adhesion of the steel filament to rubber, the surface of the filament may be plated with a metal such as Cu, Sn, Zn and the like or an alloy thereof containing Ni, Co or the like.

By way of an example, the open-twisted steel cord to be used in the invention may be manufactured by twisting a given number of previously worked steel filaments together without being closed to each other.

In the pneumatic radial tire according to the invention, the resistance to belt end separation, durability against cord breaking, irregular wear resistance and ride feeling, which were weak points of the conventional steel radial tire, may simultaneously be improved by using as the belt at least one open-twisted steel cord layer formed by embedding steel cords with a novel open-twisted construction. Each cord is composed of 4 to 5 steel filaments and has a particular elongation and twisting pitch in a coating rubber having a particular modulus. Furthermore, the coating rubber penetrates well into the inside of the open-twisted steel cord in the lengthwise and sectional direction thereof, so that the diffusion of rust is suppressed as compared with the case of using the steel cord of the conventional twisting construction. Therefore, the use of the open-twisted steel cord according to the invention is very effective for the prevention of separation failure due to the reduction of the adhesion between the steel cord and the rubber resulting from the corrosion.

The following examples are given in illustration of the invention and are not intended as limitations thereof.

EXAMPLE 1

In a radial tire for passenger car having a tire size of 185/70 HR14 and provided with a rubberized ply layer of polyester fiber cords as a carcass, there were prepared various test tires by using two open-twisted steel cord layers, each of which being formed by embedding steel cords with various open twisted constructions of 5 steel filaments, each filament having a diameter of 0.25 mm, (1×5 construction) shown in the following Table 1 in a coating rubber having a 100% modulus of 35 kg/cm$^2$, as a belt. The resistance to belt cord breaking, resistance to belt end separation, irregular wear resistance, ride feeling and production operability were evaluated with respect to these test tires to obtain a result as shown in Table 1. For the comparison, the same properties as described above were evaluated with respect to a control tire (tire No. 1) including steel cords with the conventional 1×5 construction as the belt.

Moreover, the above properties are evaluated as follows:

Resistance to belt cord breaking

The test tire was run on public road over a distance of 40,000 km under an internal pressure of 1.5 kg/cm$^2$ and further on a fixed up-and-down road over a distance of 20,000 km under an internal pressure of 1.3 kg/cm$^2$. Thereafter, the tire was opened to measure the breaking number of belt cords. This property was defined by an index on the basis that the control tire is 100. The larger the index value, the smaller the breaking number and the better the property.

Resistance to belt end separation

The test tire was run on public road over a distance of 60,000 km under an internal pressure of 1.5 kg/cm$^2$. Thereafter, the end portion of the belt was opened to measure a crack length of rubber extending from the cord end of the belt toward the inside thereof. This property was defined by an index on the basis that the control tire is 100. The larger the index value, the smaller the crack length and the better the property.

Irregular wear resistance

The test tire was run on public road over a distance of 40,000 km under an internal pressure of 1.5 kg/cm$^2$. Thereafter, the depth of the remaining tread grooves was measured at the center portion and shoulder portion (outermost groove) of the tread, respectively, whereby the irregular wear resistance was measured according to the following equation:

$$\frac{\text{groove depth at center portion} - \text{groove depth at shoulder portion}}{\text{groove depth at center portion}}$$

This property was defined by an index on the basis that the control tire is 100. The larger the index value, the better the property.

Ride feeling

A vehicle provided with the test tires was placed on a rotary drum provided at its surface with trapezoidal cleats, and then the rotation speed of the tire was raised from 40 km/h to 100 km/h, during which wave form of tire vibration riding over cleat under unsprung load was measured every rising step of 10 km/h. Then, the maximum value of vibrational amplitude was determined from the wave forms at each step as an average value, from which an index of the ride feeling was calculated according to the following equation:

$$\text{Index} = 100 + 100 \times \frac{\left(\begin{array}{c}\text{Maximum vibrational}\\\text{amplitude of}\\\text{control tire}\end{array}\right) - \left(\begin{array}{c}\text{Maximum vibrational}\\\text{amplitude of}\\\text{test tire}\end{array}\right)}{\text{Maximum vibrational amplitude of control tire}}$$

Production operability

As the production operability, there are considered the following three conditions:

(i) Cord workability in the production of steel cords;
(ii) Disordering degree of cord ends when cutting the rubberized cords at a given width in the production of tires; and
(iii) Kneadability of coating rubber.

In this item, symbol x represents the case of causing a trouble to any one of the above conditions, symbol Δ the case of causing a little trouble, and symbol of the case of causing no trouble.

TABLE 1

| | Tire No. | | | | | | | | | |
|---|---|---|---|---|---|---|---|---|---|---|
| | 1 | 2 | 3 | 4 | 5 | 6 | 7 | 8 | 9 | 10 |
| Steel cord | | | | | | | | | | |
| elongation (%) | 0 | 0.15 | 0.2 | 0.4 | 0.7 | 0.8 | 0.4 | 0.4 | 0.4 | 0.4 |
| twisting pitch (mm) | 12 | 12 | 12 | 12 | 12 | 12 | 6 | 8 | 16 | 18 |
| 100% modulus of rubber (kg/cm$^2$) | 35 | 35 | 35 | 35 | 35 | 35 | 35 | 35 | 35 | 35 |
| Results | | | | | | | | | | |
| Resistance to belt cord breaking | 100 | 102 | 131 | 141 | 151 | 158 | 168 | 158 | 122 | 108 |
| Resistance to belt end separation | 100 | 119 | 119 | 119 | 120 | 119 | 101 | 120 | 120 | 119 |
| Irregular wear resistance | 100 | 100 | 107 | 108 | 111 | 111 | 105 | 107 | 114 | 116 |
| Ride feeling | 100 | 100 | 103 | 103 | 106 | 106 | 107 | 106 | 103 | 100 |
| Production operability | o | o | o | o | Δ | x | x | o | o | x |

It can be seen from Table 1 that in the tires No. 3, 4, 5, 8 and 9 according to the invention, the properties are considerably improved and the production operability is good.

EXAMPLE 2

Various test tires were manufactured by using open-twisted steel cords having an elongation of 0.4% and a twisting pitch of 10 mm with 1×5 construction and varying 100% modulus of a coating rubber within a range of 25-70 kg/cm$^2$ as shown in the following Table 2 in the same manner as described in Example 1. Then, the same evaluation as described in Example 1 was made with respect to these tires to obtain a result as shown in Table 2.

TABLE 2

| | Tire No. | | | | |
|---|---|---|---|---|---|
| | 11 | 12 | 13 | 14 | 15 |
| Steel cord | | | | | |
| elongation (%) | 0.4 | 0.4 | 0.4 | 0.4 | 0.4 |
| twisting pitch (mm) | 10 | 10 | 10 | 10 | 10 |
| 100% modulus of rubber (kg/cm$^2$) | 25 | 30 | 35 | 55 | 70 |
| Results | | | | | |
| Resistance to belt cord breaking | 157 | 154 | 150 | 140 | 136 |
| Resistance to belt end separation | 101 | 106 | 120 | 125 | 138 |
| Irregular wear resistance | 107 | 108 | 108 | 109 | 109 |
| Ride feeling | 107 | 106 | 105 | 103 | 103 |
| Production operability | o | o | o | o | Δ |

It can be seen from Table 2 that in the tires No. 12, 13, 14 and 15 according to the invention, the properties are considerably improved and the production operability is good.

EXAMPLE 3

The same test tires as described in Example 1 were manufactured by using steel cords with an open-twisted construction of 4 steel filaments, each filament having a diameter of 0.25 mm, (1×4 construction) as shown in the following Table 3 as the open-twisted steel cord layer and then the same evaluation as described in Example 1 was made to obtain a result as shown in Table 3. For the comparison, there was used a control tire (tire No. 16) including steel cords with the conventional 1×4 construction as the belt.

TABLE 3

| | Tire No. | | |
|---|---|---|---|
| | 16 | 17 | 18 |
| Steel cord | | | |
| elongation (%) | 0 | 0.4 | 0.4 |
| twisting pitch (mm) | 9.5 | 9.5 | 12 |
| 100% modulus of rubber (kg/cm$^2$) | 35 | 35 | 35 |
| Results | | | |
| Resistance to belt cord breaking | 100 | 146 | 128 |
| Resistance to belt end separation | 100 | 116 | 118 |
| Irregular wear resistance | 100 | 108 | 110 |
| Ride feeling | 100 | 105 | 104 |
| Production operability | o | o | o |

It can be seen from Table 3 that the properties are improved in the tires No. 17 and 18 according to the invention.

What is claimed is:

1. A passenger car pneumatic radial tire comprising a carcass of radial structure and a belt superimposed about an outer periphery of a crown portion of said carcass and composed of a rubberized steel cord layer, the improvement wherein said belt is composed of at least one open-twisted steel cord layer formed by embedding open-twisted steel cords, each cord being composed of 4 to 5 adjacent steel filaments with an open-twisted construction in the lengthwise direction of the cord, said open-twisted construction having alternatively an open-twisted portion in which all of steel filaments are twisted without being closed to each other and a relatively closely twisted portion wherein at least two, but not all, of the adjacent filaments are substantially closed with each other and, said cord having an elongation of 0.2 to 0.7 percent under a load of 5 kg/cord and a twisting pitch of 8 to 16 mm, in a coating rubber having a 100% modulus of 30 to 70 kg/cm$^2$.

2. The pneumatic radial tire according to claim 1, wherein said open twisted portion and relatively closely twisted portion have an open space to make it possible to penetrate a coating rubber.

3. The pneumatic radial tire according to claim 1, wherein said coating rubber has a 100% modulus of 35-55 kg/cm$^2$.

4. The pneumatic radial tire according to claim 1, wherein said steel filament has a diameter of 0.12 to 0.4 mm.

5. An open-twisted steel cord comprising; 4 to 5 adjacent steel filaments with an open-twisted construction in the lengthwise direction of the cord, said open-twisted construction having alternatively an open-twisted portion in which all of the steel filaments are twisted without being closed to each other and a relatively closely twisted portion wherein at least two, but not all, of the adjacent filaments are substantially closed with each other and, said cord having an elongation of 0.2 to 0.7 percent under a load of 5 kg/cord.

6. The open-twisted steel cord according to claim 5, wherein said open twisted portion and relatively closely twisted portion have an open space to make it possible to penetrate a coating rubber.

7. The open-twisted steel cord according to claim 5, wherein said steel filament has a diameter of 0.12 to 0.4 mm.

8. The open-twisted steel cord according to claim 5, wherein a twisting pitch of said cord is 8 to 16 mm.

9. The open-twisted steel cord according to claim 5, wherein said cord is a 1×4 or 1×5 construction.

* * * * *